US011403385B2

(12) United States Patent
Sato et al.

(10) Patent No.: US 11,403,385 B2
(45) Date of Patent: Aug. 2, 2022

(54) INFORMATION PROCESSING SYSTEM AND INFORMATION PROCESSING METHOD

(71) Applicant: SHARP KABUSHIKI KAISHA, Sakai (JP)

(72) Inventors: Koji Sato, Sakai (JP); Hiroki Munetomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 310 days.

(21) Appl. No.: 16/700,619

(22) Filed: Dec. 2, 2019

(65) Prior Publication Data
US 2020/0184062 A1 Jun. 11, 2020

(30) Foreign Application Priority Data
Dec. 6, 2018 (JP) .............................. JP2018-229055

(51) Int. Cl.
G06F 21/35 (2013.01)
G06F 21/84 (2013.01)
H04L 12/18 (2006.01)

(52) U.S. Cl.
CPC ............. G06F 21/35 (2013.01); G06F 21/84 (2013.01); H04L 12/1822 (2013.01); H04L 12/1831 (2013.01)

(58) Field of Classification Search
CPC .......... G06F 21/35; G06F 21/84; G06F 21/34; G06F 21/32; G06F 21/305; H04L 63/0853; H04L 63/0861; H04L 63/12; H04L 12/1822; H04L 12/1831; H04W 12/06; H04W 12/50; H04W 12/61
See application file for complete search history.

(56) References Cited

U.S. PATENT DOCUMENTS

| 6,873,260 B2* | 3/2005 | Lancos | G07C 9/28 340/5.2 |
| 10,997,809 B2* | 5/2021 | Petkov | H04N 5/247 |
| 11,061,453 B1* | 7/2021 | Ruiz, III | G06F 11/0751 |
| 2003/0215114 A1* | 11/2003 | Kyle | G06V 10/94 382/115 |
| 2007/0215698 A1* | 9/2007 | Perry | G06Q 20/20 235/380 |
| 2008/0104668 A1* | 5/2008 | Fujikawa | G06F 21/84 726/2 |

(Continued)

FOREIGN PATENT DOCUMENTS

JP 2015-022514 A 2/2015
WO WO-2017005962 A1 * 1/2017 ............. G06F 21/40

Primary Examiner — Saleh Najjar
Assistant Examiner — Khalid M Almaghayreh
(74) Attorney, Agent, or Firm — ScienBiziP, P.C.

(57) ABSTRACT

A meeting system includes an identification information acquirer that acquires a card ID, based on a user's operation of touching a reader with an ID card 5 for identifying the user, an authentication process operator that determines whether or not to grant an authentication of the user, based on the card ID acquired by the identification information acquirer, and a command process operator that issues a command for commanding an operation corresponding to a desired operation of the user, where the command is associated with the card ID corresponding to the user, if the authentication of the user is granted by the authentication process operator.

10 Claims, 15 Drawing Sheets

(56) References Cited

U.S. PATENT DOCUMENTS

| | | | |
|---|---|---|---|
| 2013/0147705 A1* | 6/2013 | Lee | G06F 3/01 |
| | | | 345/156 |
| 2015/0100503 A1* | 4/2015 | Lobo | G06Q 10/103 |
| | | | 705/301 |
| 2015/0170446 A1* | 6/2015 | Burba | G07C 9/32 |
| | | | 340/5.52 |
| 2015/0269361 A1* | 9/2015 | Grassel | G06F 21/10 |
| | | | 726/28 |
| 2015/0328985 A1* | 11/2015 | Kim | A61B 5/163 |
| | | | 180/272 |
| 2017/0255788 A1* | 9/2017 | Liu | G06F 21/6218 |
| 2018/0367542 A1* | 12/2018 | Wolf | H04L 63/102 |
| 2019/0182176 A1* | 6/2019 | Niewczas | H04W 12/06 |
| 2019/0188508 A1* | 6/2019 | Zebley | G06F 21/6245 |
| 2020/0068400 A1* | 2/2020 | Ramic | H04L 63/102 |

* cited by examiner

FIG. 3

AUTHENTICATION INFORMATION DB (121)

| USER NAME | CARD ID | AUTHENTICATION LINKAGE | COMMAND TARGET DEVICE | COMMAND ID | COMMAND CONTENT |
|---|---|---|---|---|---|
| A | aabbcc | ON: LOGIN | PC1 | 1 | DISPLAY MATERIAL-1 |
| B | bbccdd | ON: LOGIN | PC2 | 1 | LAUNCH APP-1 |
|   |        | ON: NORMAL |    | 2 | DISPLAY MATERIAL-2 |
| C | ccddee | OFF | PC3 | 1 | LAUNCH APP-2 |
| D | ddeeff | ON: NORMAL | PC4 | 1 | DISPLAY MATERIAL-3 |
| ... | ... | ... | ... | ... | ... |

FIG. 4

MEETING AUTHENTICATION INFORMATION DB 122

| MEETING ID | DATE AND TIME | LOCATION | USER NAME | CARD ID | AUTHENTICATION LINKAGE | COMMAND TARGET DEVICE | COMMAND ID | AUTHENTICATION CONDITION (TOUCH AUTHENTICATION COUNT) | AUTHENTICATION STATUS |
|---|---|---|---|---|---|---|---|---|---|
| M001 | 2018/10/05 13:00-14:00 | TOKYO | A | aabbcc | ON: LOGIN | PC1 | 1 | 5 | CONNECTED |
| | | | B | bbccdd | ON: LOGIN | PC2 | 1 | 2 | LOGOFF |
| | | | C | ccddee | ON: NORMAL | | 2 | 3 | |
| | | | | | OFF | PC3 | 1 | 2 | CONNECTED |
| | | NARA | D | ddeeff | ON: NORMAL | PC4 | 1 | 4 | CONNECTED |

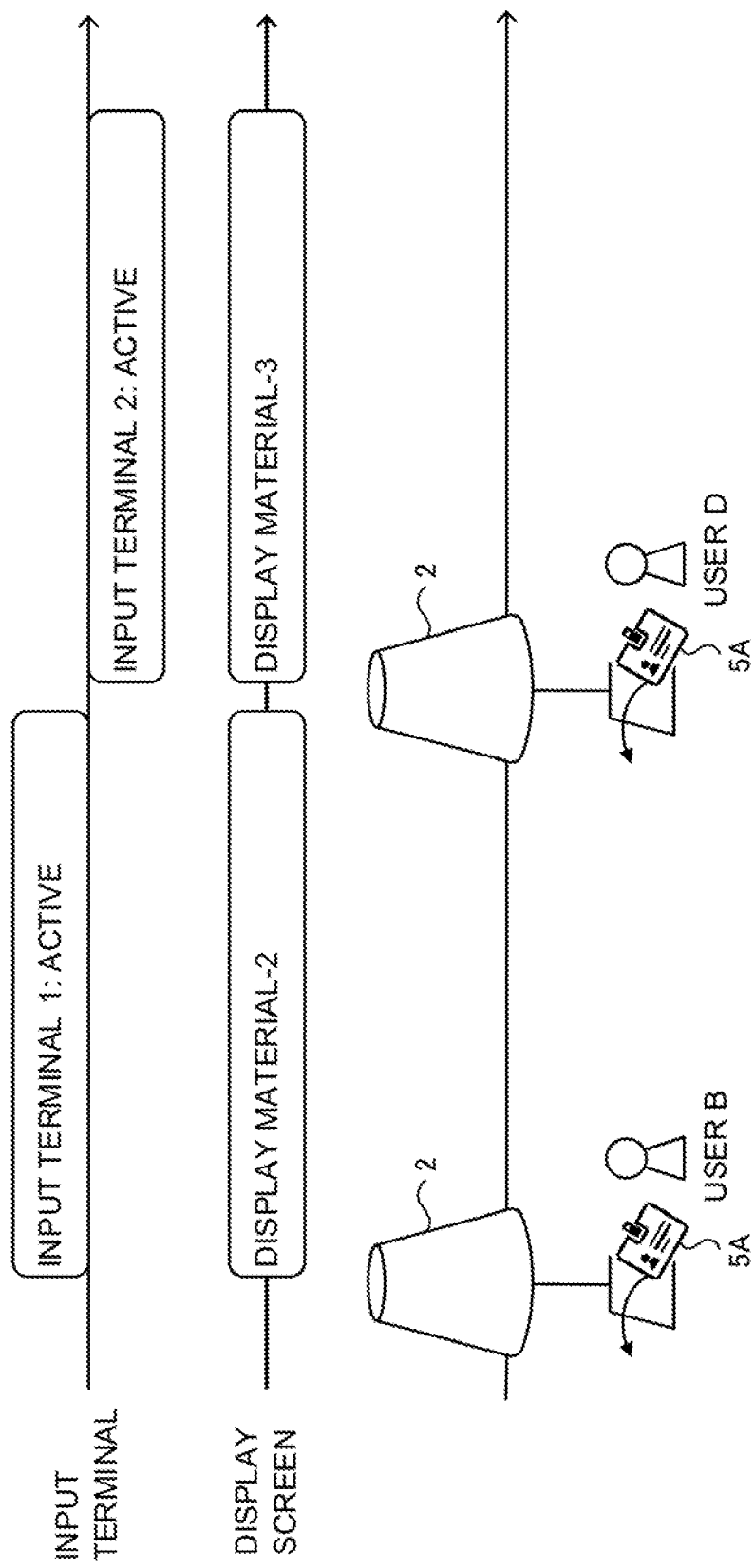

FIG. 10

MEETING AUTHENTICATION INFORMATION DB

| MEETING ID | DATE AND TIME | LOCATION | USER NAME | CARD ID | AUTHENTICATION LINKAGE | COMMAND TARGET DEVICE | COMMAND ID | AUTHENTICATION CONDITION (TOUCH AUTHENTICATION COUNT) | | AUTHENTICATION STATUS |
|---|---|---|---|---|---|---|---|---|---|---|
| M001 | 2018/10/05 13:00-14:00 | TOKYO | A | aabbcc | ON: LOGIN | PC1 | 1 | A | 5 | CONNECTED |
| | | | B | bbccdd | ON: LOGIN | PC2 | 1 | C | 3 | LOGOFF |
| | | | | | ON: NORMAL | | 2 | B | 2 | |
| | | | C | ccddee | LOGONOFF | PC3 | 1 | B | 3 | CONNECTED |
| | | | | | | | | C | 2 | |
| | | NARA | D | ddeeff | ON: NORMAL | PC4 | 1 | B | 1 | CONNECTED |
| | | | | | | | | D | 4 | |

| | TO | A@sharp.co.jp |
|---|---|---|
| SEND | CC | |
| | SUBJECT | AUTHENTICATION INFORMATION REQUIRED FOR MEETING |

CARD AUTHENTICATION INFORMATION REQUIRED FOR MEETING IS AS FOLLOWS:
2018/10/05 13:00-14:00 A PROJECT MEETING

| USER NAME | WHEN CARD IS AUTHENTICATED | AUTHENTICATED BY | ORDER | TOUCH COUNT | COMMAND |
|---|---|---|---|---|---|
| A (YOU) | LOGIN | A | 1 | 5 | DISPLAY MATERIAL-1 |
| | | ? | 2 | ? | |

FIG. 11B

| | TO | C@sharp.co.jp |
|---|---|---|
| SEND | CC | |
| | SUBJECT | AUTHENTICATION INFORMATION REQUIRED FOR MEETING |

CARD AUTHENTICATION INFORMATION REQUIRED FOR MEETING IS AS FOLLOWS:
2018/10/05 13:00-14:00 A PROJECT MEETING

| USER NAME | WHEN CARD IS AUTHENTICATED | AUTHENTICATED BY | ORDER | TOUCH COUNT | COMMAND |
|---|---|---|---|---|---|
| C(YOU) | LOGIN | C | 1 | 2 | NOT ISSUE |
| | | ? | 2 | ? | |
| A | LOGIN | C | 2 | 3 | ? |

FIG. 11C

| | TO | B@sharp.co.jp |
|---|---|---|
| SEND | CC | |
| | SUBJECT | AUTHENTICATION INFORMATION REQUIRED FOR MEETING |

CARD AUTHENTICATION INFORMATION REQUIRED FOR MEETING IS AS FOLLOWS:

2018/10/05 13:00-14:00 A PROJECT MEETING

| USER NAME | WHEN CARD IS AUTHENTICATED | AUTHENTICATED BY | ORDER | TOUCH COUNT | COMMAND |
|---|---|---|---|---|---|
| B (YOU) | LOGIN | B | 1 | 2 | LAUNCH APP-1 |
| | NORMAL | B | 1 | 3 | DISPLAY MATERIAL-2 |
| C | LOGIN | B | 2 | 1 | ? |

FIG. 13

MEETING AUTHENTICATION INFORMATION DB

| MEETING ID | DATE AND TIME | LOCATION | USER NAME | CARD ID | AUTHENTICATION LINKAGE | COMMAND TARGET DEVICE | COMMAND ID | AUTHENTICATION CONDITION (TOUCH AUTHENTICATION COUNT) | | AUTHENTICATION STATUS |
|---|---|---|---|---|---|---|---|---|---|---|
| M001 | 2018/10/05 13:00-14:00 | TOKYO | A | aabbcc | ON: LOGIN | PC1 | 1 | *A | 5 | CONNECTED |
| | | | | | | | | *C | 3 | |
| | | | B | bbccdd | ON: LOGIN | PC2 | 1 | B | 2 | LOGOFF |
| | | | | | ON: NORMAL | | 2 | B | 3 | |
| | | | C | ccddee | OFF | PC3 | 1 | *C | 3 | CONNECTED |
| | | | | | | | | *A | 5 | |
| | | NARA | D | ddeeff | ON: NORMAL | PC4 | 1 | D | 4 | CONNECTED |

122

INFORMATION PROCESSING SYSTEM AND INFORMATION PROCESSING METHOD

INCORPORATION BY REFERENCE

This application is based upon and claims the benefit of priority from the corresponding Japanese Patent Application No. 2018-229055 filed on Dec. 6, 2018, the entire contents of which are incorporated herein by reference.

BACKGROUND OF THE INVENTION

Field of the Invention

The present disclosure relates to an information processing system for executing a predetermined command, based on user authentication information, and relates also to an information processing method therefor.

Description of the Background Art

There is known a meeting system in which an ID of an ID card possessed by a participant participating in a meeting is authenticated, and the participant is granted to participate in the meeting if the authentication is successful. In a conventional meeting, materials used in the meeting are distributed to each participant in advance, or the presenter displays the materials on a monitor after the meeting starts.

However, in the conventional technology, for example, it is necessary for the presenter to perform an operation of displaying the materials on the monitor at the start of the meeting, or to perform an operation of switching the materials when the presenters are changed during the meeting. This complicates the operations in the meeting.

An object of the present disclosure is to provide an information processing system and an information processing method with which it is possible to simplify user operations in a meeting.

SUMMARY OF THE INVENTION

An information processing system according to an aspect of the present disclosure includes: an identification information acquirer that acquires, based on a user's operation of inputting identification information for identifying the user, the identification information; an authenticator that determines whether or not to grant an authentication of the user, based on the identification information acquired by the identification information acquirer; and a command executor that executes a command for commanding an operation corresponding to a desired operation of the user, where the command is associated with the identification information corresponding to the user, if the authentication of the user is granted by the authenticator.

An information processing method according to another aspect of the present disclosure includes: acquiring, based on a user's operation of inputting identification information for identifying the user, the identification information; determining whether or not to grant an authentication of the user, based on the acquired identification information; and executing a command for commanding an operation corresponding to a desired operation of the user, where the command is associated with the identification information corresponding to the user, if the authentication of the user is granted.

According to the present disclosure, it is possible to provide an information processing system and an information processing method capable of simplifying user operations in a meeting.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table showing an example of authentication information used in a server device of the meeting system according to the embodiment of the present disclosure;

FIG. 4 is a table showing an example of meeting authentication information used in the server device of the meeting system according to the embodiment of the present disclosure;

FIG. 9 is a diagram schematically illustrating a timing for input switching of a display screen in the meeting system according to the embodiment of the present disclosure;

FIG. 10 is a table showing another example of the meeting authentication information used in the server device of the meeting system according to the embodiment of the present disclosure;

FIG. 11A is a diagram illustrating an example of information notified by the server device to a user according to an embodiment (first modification) of the present disclosure;

FIG. 11B is a diagram illustrating an example of information notified by the server device to the user according to the embodiment (first modification) of the present disclosure;

FIG. 11C is a diagram illustrating an example of information notified by the server device to the user according to the embodiment (first modification) of the present disclosure;

FIG. 13 is a table showing another example of the meeting authentication information used in the server device of the meeting system according to the embodiment of the present disclosure.

DESCRIPTION OF THE PREFERRED EMBODIMENTS

Below, an embodiment of the present disclosure will be described with reference to the accompanying drawings to facilitate understanding of the present disclosure. It is noted that the following embodiment is an example in which the present disclosure is embodied, and does not limit the technical scope of the present disclosure.

Meeting System 100

Figure 1:
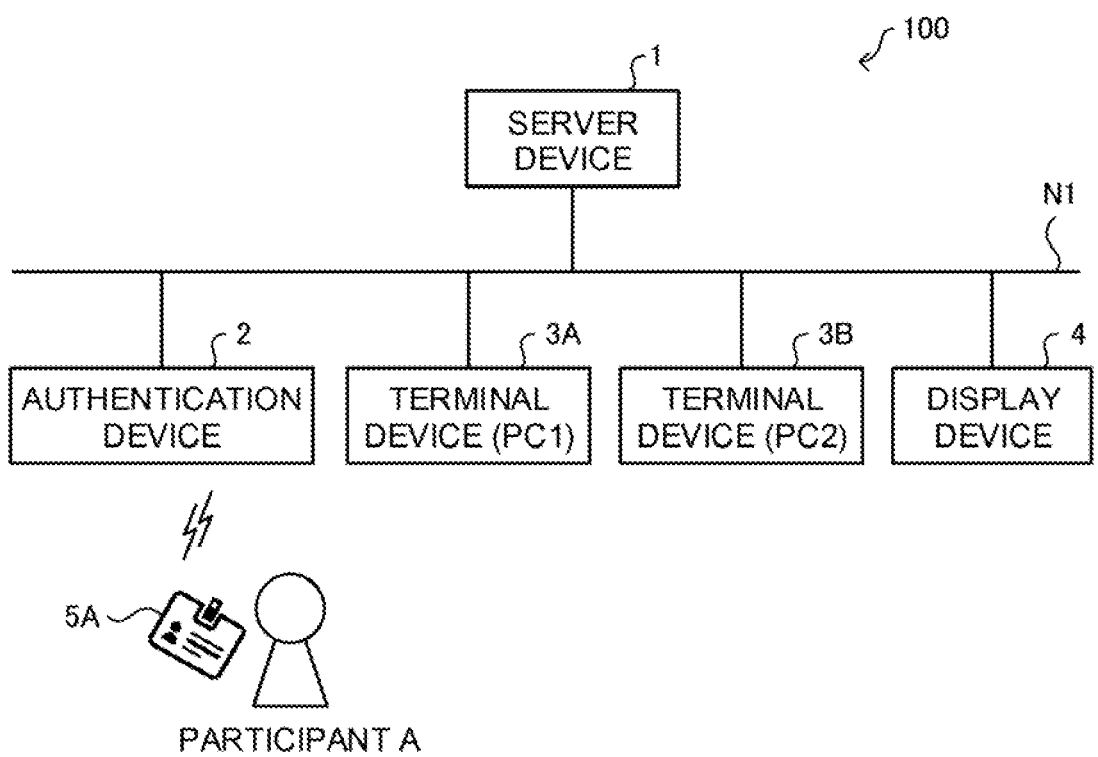
FIG. 1 is a diagram illustrating a simplified configuration of a meeting system according to an embodiment of the present disclosure.

As illustrated in FIG. 1, a meeting system 100 according to an embodiment of the present disclosure includes a server device 1, an authentication device 2, a terminal device 3 (for example, terminal devices 3A and 3B), and a display device 4. The server device 1, the authentication device 2, the terminal device 3, and the display device 4 can communicate with one another via a communication network N1 such as the Internet, LAN, WAN, or a public telephone line. It is noted that the terminal device 3 and the display device 4 may include a plurality of terminal devices 3 and a plurality of display devices 4, respectively. The meeting system 100 is an example of an information processing system of the present disclosure, and the terminal device 3 is an example of a terminal device of the present disclosure. Further, the information processing system of the present disclosure may include the server device 1 or the authentication device 2, may include the server device 1 and the authentication device 2, or may include the server device 1, the authentication device 2, and the terminal device 3.

The meeting system 100 is used for a meeting, for example. The meeting system 100 performs an authentication process according to a predetermined authentication input operation (an example of an input operation of the present disclosure) of a user participating in the meeting. In addition, the meeting system 100 transmits, to the terminal device 3, a command (such as an operation control command) for commanding an operation corresponding to a desired operation of a user granted with an authentication to the meeting, and causes the terminal device 3 to execute an operation according to the command.

Here, an example of a usage scene of a process to be executed in the meeting system 100 according to the embodiment of the present disclosure is provided.

For example, when participating in a predetermined meeting, a user A touches (swipes), with an ID card 5A (see FIG. 1) owned by the user A, a reader 25 (see FIG. 2) (for example, a card reader) of the authentication device 2 installed at an entrance or an exit of a meeting room or inside therein. At this time, the user A touches the card reader five times with the ID card 5A according to a previously set authentication condition (for example, the touch authentication count: "five times"). The touch authentication count is previously set for each user (participant) participating in the meeting, and is notified to each user in advance. The authentication device 2 grants the authentication of the user A if a touch count made by the ID card 5A of the user A (here, five times) matches the touch authentication count, and does not grant the authentication of the user A if the touch count does not match the touch authentication count. The authentication device 2 notifies the user A and the server device 1 of an authentication result.

If the authentication of the user A is granted, the server device 1 transmits the command previously set corresponding to the user A, to the terminal device 3 set as a device (hereinafter, a command target device) to execute the command. The command is a command for causing the terminal device 3 to execute a predetermined operation corresponding to a user's desired operation, and a user (participant) participating in the meeting individually sets the command together with the command target device as necessary. For example, if the user A sets "display material-1" as the command and sets "PC1" (terminal device 3A) as the command target device, the server device 1 transmits, to the terminal device 3A, a command corresponding to the "display material-1".

When acquiring the command, the terminal device 3A executes the command. For example, the terminal device 3A displays the "material-1" on the display device 4. If the command is a command for launching a predetermined application, the terminal device 3A, upon acquiring the command, launches the application.

Here, the command includes a switching command for enabling a connection between the command target device and the display device 4. For this reason, for example, if the command is transmitted to the terminal device 3A, the terminal device 3A can establish the connection with the display device 4 to control display of the display device 4.

Thus, when participating in the meeting, the user A performs an authentication input operation according to the authentication condition set to the user A. If the authentication of the user A is granted, the command previously set by the user A is executed. Further, in the meeting system 100, the user A can also perform the authentication input operation during the meeting. If the authentication of the user A is granted during the meeting, a command during the meeting previously set by the user A is executed.

The meeting system 100 according to the embodiment of the present disclosure can simplify user operations in the meeting. A specific configuration of the meeting system 100 for realizing the above process will be described below.

Server Device 1

Figure 2:
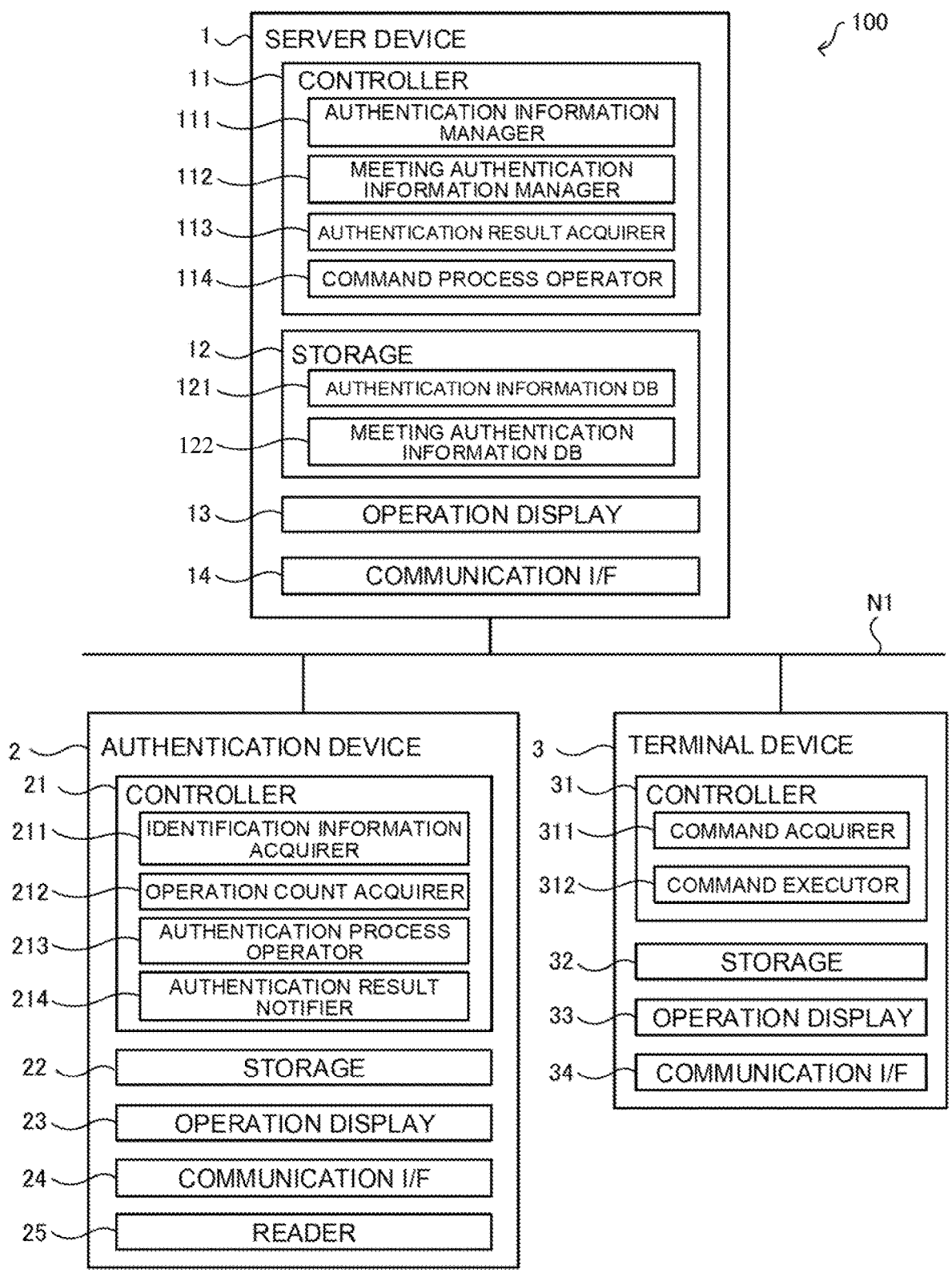
FIG. 2 is a block diagram illustrating a configuration of the meeting system according to the embodiment of the present disclosure.

As illustrated in FIG. 2, the server device 1 is a server computer including a controller 11, a storage 12, an operation display 13, a communication I/F 14, and the like. It is noted that the server device 1 is not limited to one computer, and may be a computer system in which a plurality of computers operate in cooperation. Further, various types of processes executed in the server device 1 may be executed in a distributed manner by one or more processors. Further, the server device 1 may be installed at a place different from a place where the authentication device 2 is installed (for example, a meeting room) or on a cloud network to perform data communication with the authentication device 2, the terminal device 3, and the like.

The communication I/F 14 is a communication interface for allowing connection between the server device 1 and the communication network N1 in a wired or wireless manner to execute data communication according to a predetermined communication protocol between the server device 1 and an external device such as the authentication device 2 and the terminal device 3 via the communication network N1.

The operation display 13 is a user interface including a display such as a liquid crystal display or an organic EL display that displays various types of information, and an operation processor such as a mouse, a keyboard, or a touch panel that receives an operation.

The storage 12 is a non-volatile storage including a semiconductor memory, a Hard Disk Drive (HDD), or a Solid State Drive (SSD) that store various types of information.

Specifically, the storage 12 stores an authentication information DB 121 in which the authentication information of a plurality of users in the meeting system are registered. FIG. 3 is a table showing an example of the authentication information DB 121. In the authentication information DB 121, authentication information such as a user name, a card ID, authentication linkage information, a command target device, a command ID, and a command content is registered. The information on the command target device is an example of terminal information of the present disclosure. The command target device may be a mobile terminal (such as the terminal device 3) owned by the user and carried to the meeting, or may be a terminal device (such as the terminal device 3) provided in advance in the meeting room. The information on the command ID and the command content are examples of command information of the present disclosure. In the authentication information DB 121, the authentication information on a user (participant) participating in the meeting is registered. Each user participating in the meeting registers the authentication information on an operation terminal (for example, the terminal device 3) of the user before a start of the meeting. The card ID is unique ID information (card ID) in the ID card 5 owned by each user. The card ID is an example of identification information of the present disclosure.

The command content is a content of a command to be executed in a predetermined command target device (for example, PC1: terminal device 3A in a case of the user A) if the authentication of the user is granted for participation in the meeting, and is a command character string. The user registers a command corresponding to a desired operation (action) as necessary. The command ID is associated with each command content. For example, if the authentication of the user A is granted, a command with the command ID "1" is transmitted to the PC 1 (terminal device 3A) being the command target device. Each user may set one command or a plurality of commands.

The authentication linkage information is information indicating whether or not to transmit the command if the authentication of the user is granted. An item "ON: login" indicates that the command is transmitted if the authentication (login authentication) of the user is granted when the user participates in the meeting (when the meeting starts). An item "ON: normal" indicates that the command is transmitted if the authentication (normal authentication) of the user is granted during the meeting. An item "OFF" indicates that the command is not transmitted even if the authentication of the user is granted. As described above, the authentication linkage information is information indicating whether or not the authentication process and the command issuance process are linked with each other.

In the storage 12, a meeting authentication information DB 122 in which the meeting information and the authentication information are registered, is stored. FIG. 4 is a table showing an example of the meeting authentication information DB 122. In the meeting authentication information DB 122, a meeting ID, a meeting date and time, a meeting place, a user name, a card ID, authentication linkage information, a command target device, a command ID, an authentication condition (touch authentication count), an authentication status, and the like are registered. In the meeting authentication information DB 122, the authentication information and information on the meeting are registered. For example, a meeting administrator registers the meeting information before a start of the meeting at an operation terminal of the meeting administrator (for example, the terminal device 3). It is noted that in the meeting, a meeting system in which a remote meeting allowing a user to participate at a different place (base) can be held may be introduced.

In the meeting authentication information DB 122, the authentication condition is information indicating an operation condition for granting an authentication of the user. Here, as the authentication condition, the number of times that the user A touches, with the ID card 5A, the reader 25 (see FIG. 2) of the authentication device 2 within a predetermined time period is set. The authentication condition is set individually for each user by the controller 11 of the server device 1.

The authentication status is information indicating a current status of a user. The authentication status of a user starts from a "logoff" state. If the authentication is granted, the state temporarily transitions to a "login" state, and then transitions to a "connected" state. In the command issuance process at the time of login, a necessary process is performed after the authentication state once transitions to the "login" state, and then the authentication state transitions to the "connected" state. For example, if the authentication of the user A is granted, the "logoff" state is once transitioned to the "login" state, and the command with the command ID "1" ("display material-1") is executed. Thereafter, "connected" is registered in the authentication status. Further, for example, in a case of a user C, after the authentication is granted, the command is not executed because the authentication linkage information is OFF although the authentication state is temporarily the "login" state, and the authentication status is directly transitioned to the "connected" state. In a case of a user D, after the authentication is granted, the authentication state is temporarily the "login" state, but since the command issuance process at the time of login is not set, the command operation for the granted authentication is not performed, and the authentication state is directly transitioned to the "connected" state. However, in the case of the user D, since the authentication linkage information at the normal time is set to ON, the authentication operation is performed at any timing in the "connected" state, and the command with the command ID "1" is executed if a result of the authentication operation is determined to be correct. For example, if the authentication is not performed or the authentication is not granted as in a case of a user B, the "logoff" remains registered in the authentication status. Further, when the meeting ends or a user exits in the middle of the meeting, "logoff" is also registered in the authentication status if the user performs an authentication input operation, such that the authentication is granted.

It is noted that as another embodiment, a part or all of the authentication information DB 121 and the meeting authentication information DB 122 may be stored in the authentication device 2.

Further, the storage 12 stores a control program such as a command issuance processing program for causing the controller 11 to execute a command issuance process (see FIG. 6) described later. For example, the command issuance processing program is recorded non-temporarily on a computer-readable recording medium such as a USB, a CD, or a DVD. The command issuance processing program is read by a reading device (not illustrated) such as a USB drive, a CD drive, or a DVD drive provided in the server device 1, and stored in the storage 12. Further, the command issuance processing program may be downloaded from an external device via the communication network N1 and stored in the storage 12.

The controller 11 includes a control device such as a CPU, a ROM, and a RAM. The CPU is a processor that executes various types of arithmetic processes. The ROM is a non-volatile storage in which a control program such as BIOS and OS for causing the CPU to execute various types of arithmetic processes is stored in advance. The RAM is a volatile or non-volatile storage that stores various types of information, and is used as a temporary storage memory (working area) for various types of processes executed by the CPU. The controller 11 controls the server device 1 by causing the CPU to execute various types of control programs stored in advance in the ROM or the storage 12.

Specifically, as illustrated in FIG. 2, the controller 11 includes various types of process operators such as an authentication information manager 111, a meeting authentication information manager 112, an authentication result acquirer 113, and a command process operator 114. It is noted that the controller 11 functions as the various types of process operators by causing the CPU to execute various types of processes according to the command issuance processing program. Moreover, some or all of the process operators included in the controller 11 may include an electronic circuit. It is noted that the command issuance processing program may be a program for causing a plurality of processors to function as the various types of process operators.

The authentication information manager 111 manages the authentication information in the authentication information DB 121 (see FIG. 3). Specifically, the authentication information manager 111 acquires the authentication information registered by a user, and registers the acquired authentication information in the authentication information DB 121.

The meeting authentication information manager 112 manages the meeting authentication information in the meeting authentication information DB 122 (see FIG. 4). Specifically, the meeting authentication information manager 112 acquires the authentication information and the meeting information registered by a user, a meeting administrator, and the like, and registers the acquired authentication information and the meeting information in the meeting authentication information DB 122. Further, the meeting authentication information manager 112 sets the authentication condition (touch authentication count) for each user, and registers the set authentication condition in the meeting authentication information DB 122. For example, the meeting authentication information manager 112 randomly sets the touch authentication count different depending on each user. It is noted that a user may set the touch authentication count, and the meeting authentication information manager 112 may register the touch authentication count in the meeting authentication information DB 122. Further, in a configuration that requires an authentication input operation of another user for authentication of a user to be authenticated (see a first modification described later), the meeting authentication information manager 112 sets an order of the authentication input operations of a plurality of users. The meeting authentication information manager 112 individually notifies each user of the information on the set touch authentication count (authentication condition) by using a mail address (not illustrated) of the user previously managed in a part of user information. An Example of information (authentication information required for the meeting) notified to a user scheduled to participate in the meeting is illustrated in FIGS. 11A, 11B, and 11C (details of which will be described later). For example, the meeting authentication information manager 112 transmits the information on the touch authentication count of the user A to a previously registered mail address of the user A. In addition, the meeting authentication information manager 112 transmits the meeting authentication information DB 122 to the authentication device 2. The touch authentication count is an example of a set count of the present disclosure.

The authentication result acquirer 113 acquires, from the authentication device 2, a result (authentication result) of the authentication process (see FIG. 5A and FIG. 5B) executed in the authentication device 2 described later.

If the authentication result acquirer 113 acquires the authentication result, the meeting authentication information manager 112 updates the authentication status in the meeting authentication information DB 122. For example, before the start of the meeting, the meeting authentication information manager 112 registers "logoff" in the authentication status (see FIG. 4). If the authentication result acquirer 113 acquires an authentication result of "authentication granted" (authentication success) from the authentication device 2 at the start of the meeting, the meeting authentication information manager 112 registers "connected" in the authentication status (see FIG. 4). Further, if the authentication result acquirer 113 does not acquire an authentication result of "authentication granted" (authentication success), the meeting authentication information manager 112 registers "logoff" in the authentication status.

When the authentication result acquirer 113 acquires the authentication result, the authentication device 2 displays, to the user, information corresponding to the authentication result. For example, if the authentication result acquirer 113 acquires an authentication result "authentication not granted" (authentication failure), the authentication device 2 notifies the corresponding user terminal or terminal device 3 of a message or the like indicating that the authentication is not granted.

If the authentication result acquirer 113 acquires the authentication result of "authentication granted", the command process operator 114 transmits a predetermined command to the command target device corresponding to a user of which the authentication is granted. For example, if the authentication of the user A is granted at the start of the meeting, the command process operator 114 transmits the command "display material-1" with the command ID "1" to the PC 1 (terminal device 3A) being the command target device. Further, for example, if the authentication of the user D is granted during the meeting, the command process operator 114 transmits a command "display material-3" with the command ID "1" to a PC 4 (terminal device 3) being the command target device. It is noted that the user C has the authentication linkage information (see FIG. 4) set to "OFF", and thus, even if the authentication of the user C is granted at the start of the meeting or during the meeting, the command process operator 114 does not perform the command issuance process and transmission process. The command process operator 114 is an example of a command issuer of the present disclosure.

It is noted that in another embodiment of the server device 1, some or all of the process operators included in the controller 11 may be provided in the authentication device 2.

Authentication Device 2

As illustrated in FIG. 2, the authentication device 2 includes a controller 21, a storage 22, an operation display 23, a communication I/F 24, a reader 25, and the like. The authentication device 2 is a device installed for each meeting room where a meeting is held, for example. Examples of the authentication device 2 may include an information processing device such as a tablet terminal or a personal computer to which the reader 25 described later is connected. If the meeting is a remote meeting in which a plurality of sites are connected, the authentication device 2 is installed at each of the sites. Further, the authentication device 2 may include a plurality of authentication devices 2, and thus, a single authentication device 2 or a plurality of authentication devices 2 may be installed at one site.

The reader 25 is a reading device that reads unique ID information (card ID) in the ID card 5. The reader 25 is, for example, a card reader. If the ID information is embedded in a one-dimensional code or a two-dimensional code, the reader 25 includes a camera for reading an information code. Further, if the ID information is recorded on an IC chip, the reader 25 includes a contact or contactless IC card reader using short-range wireless communication. It is noted that the ID card 5 is an example of a card medium according to the present disclosure. The card medium according to the present disclosure may be a card medium including a one-dimensional code or a two-dimensional code, or may be an IC card. Further, in the meeting system 100, a mobile terminal (for example, a smartphone) possessed by a user can be used instead of a card medium. In this case, for example, the reader 25 may read the ID information by capturing a QR code (registered trademark) displayed on a smartphone.

The communication I/F 24 is a communication interface for connecting the authentication device 2 to the communication network N1 in a wired or wireless manner to execute data communication according to a predetermined communication protocol between the authentication device 2 and an external device such as the server device 1 via the communication network N1.

The operation display 23 is a user interface including a display such as a liquid crystal display or an organic EL display that displays various types of information, and an operation processor such as a mouse, a keyboard, or a touch panel that receives an operation. It is noted that in the operation display 23, an operation processor may be omitted if an operation using a keyboard or a touch panel by the user is not required. Further, the display may be an LED that emits color light according to a user's authentication status. The LED is an example of a light emitter of the present disclosure.

The storage 22 is a non-volatile storage including a semiconductor memory, an HDD, an SSD, or the like that stores various types of information.

The storage 22 stores the meeting authentication information DB 122 (see FIG. 4) transmitted from the server device 1.

Further, the storage 22 stores a control program such as an authentication program for causing the controller 21 to execute an authentication process (see FIG. 5A and FIG. 5B) described later. For example, the authentication program is recorded non-temporarily on a computer-readable recording medium such as a USB, a CD, or a DVD, and read by a reading device (not illustrated) such as a USB drive, a CD drive, or a DVD drive electrically connected to the authentication device 2, and stored in the storage 22. Further, the authentication program may be downloaded from an external device via the communication network N1 and stored in the storage 22.

The controller 21 includes control devices such as a CPU, a ROM, and a RAM. The CPU is a processor that executes various types of arithmetic processes. The ROM is a non-volatile storage in which a control program such as BIOS and OS for causing the CPU to execute various types of processes is stored in advance. The RAM is a volatile or non-volatile storage that stores various types of information, and is used as a temporary storage memory (working area) for various types of processes executed by the CPU. Then, the controller 21 controls the authentication device 2 by causing the CPU to execute various types of control programs stored in advance in the ROM or the storage 22.

Specifically, the controller 21 includes various types of process operators such as an identification information acquirer 211, an operation count acquirer 212, an authentication process operator 213, and an authentication result notifier 214. It is noted that the controller 21 functions as the various types of process operators by causing the CPU to execute various types of processes according to the authentication program. Moreover, some or all of the process operators included in the controller 21 may include an electronic circuit. It is noted that the authentication program may be a program for causing a plurality of processors to function as the various types of process operators.

The identification information acquirer 211 acquires ID information, based on an input operation, by a user, of the ID information for identifying the user. For example, the identification information acquirer 211 acquires the ID information, based on the input operation, by a user, at the start of the meeting or during the meeting. Specifically, the identification information acquirer 211 acquires unique ID information (card ID) in the ID card 5 read by the reader 25, based on a user's operation of touching the reader 25 with the ID card 5.

The operation count acquirer 212 acquires an operation count indicating a count of the input operations performed by a user within a predetermined time period. Specifically, the operation count acquirer 212 acquires a touch count made by a user performing the touch operation on the reader 25 within a predetermined time period. For example, the operation count acquirer 212 acquires the number of times that the card ID is read by the reader 25 as the operation count. For example, if the user A touches, continuously a plurality of number of times, the reader 25 with the ID card 5A within a predetermined time period, the identification information acquirer 211 acquires, continuously a plurality of number of times, the ID information in the ID card 5A. Further, the operation count acquirer 212 counts the touch count within a predetermined time period, and if continuously acquiring the same ID information within a predetermined time period, determines that a touch operation is made by the same user to acquire the counted touch count. Here, the operation count acquirer 212 refers to the card ID information notified from the identification information acquirer 211 and acquires "five times" as the touch count of the touch operation by the user A. Further, the identification information acquirer 211 is an example of an identification information acquirer of the present disclosure, and the operation count acquirer 212 is an example of an operation count acquirer of the present disclosure. Further, the touch operation is an example of an input operation of the present disclosure, and the touch count is an example of an operation count of the present disclosure. That is, the input operation of the present disclosure is an operation for causing the reader 25 to read a card medium (for example, the ID card 5) including identification information such as ID information.

It is noted that in the above-described example, the identification information acquirer 211 accepts the touch operation as the authentication input operation of a user, but the input operation of the present disclosure is not limited thereto. For example, the user input operation may be an operation of inputting personal information such as a card ID, a password, and biometric information from the operation display 23. In this case, the operation count acquirer 212 acquires an input count (operation count) of the personal information.

The authentication process operator 213 authenticates a user, based on the card ID acquired by the identification information acquirer 211. For example, the authentication process operator 213 authenticates the user, based on the card ID acquired by the identification information acquirer 211 by the input operation of the user at the start of or during the meeting and operation count information acquired by the operation count acquirer 212. Specifically, the authentication process operator 213 acquires the authentication condition (touch authentication count) associated with the card ID from the meeting authentication information DB 122 (see FIG. 4) stored in the storage 22. Then, the authentication process operator 213 determines whether or not the touch count acquired by the operation count acquirer 212 matches the authentication condition (touch authentication count). The authentication process operator 213 grants the authentication if the touch count matches the touch authentication count, and does not grant the authentication if the touch count does not match the touch authentication count. It is noted that if the touch count does not match the touch authentication count, the operation count acquirer 212 resets the counted touch count or sets again the touch count after transitioning to a procedure at the time of the authentication not granted. The authentication process operator 213 is an example of an authenticator of the present disclosure. It is noted that in a configuration that requires an authentication input operation of another user for the authentication of a user to be authenticated (see first modification described later), the authentication process operator 213 performs the authentication of the user to be authenticated in consideration of a determination result for the touch count corresponding to each of a plurality of other users.

The authentication result notifier 214 notifies the user and the server device 1 of a result of the authentication process by the authentication process operator 213 ("authentication granted" or "authentication not granted"). Further, the authentication result notifier 214 externally notifies information indicating the authentication result. For example, in the display of the operation display 23, the authentication result notifier 214 causes the LED to light up in red during standby, causes the LED to light up in green if the user A touches the reader 25 with the ID card 5A once, and causes the LED to light up in yellow if the user A touches the reader 25 with the ID card 5A five times so that the authentication is granted. Further, the authentication result notifier 214 blinks the LED in red if authentication is not granted. It is noted that the display (LED) is preferably provided in a position where it is difficult for a third party other than the user performing the authentication input operation to visually recognize the display (LED). This prevents information leakage of the authentication condition (touch authentication count). The authentication result notifier 214 is an example of a notifier of the present disclosure.

Further, the authentication result notifier 214 may notify, with sound, the information indicating the authentication result from a speaker (not illustrated). It is noted that the speaker preferably includes a speaker with a directivity not allowing a third party other than the user performing the authentication input operation to easily hear the sound.

Here, in the meeting authentication information DB 122 illustrated in FIG. 4, as a command corresponding to the user B, a first command (command ID "1" (an example of first command information of the present disclosure)) and a second command (command ID "2" (an example of second command information of the present disclosure) are registered. Further, in the card ID corresponding to the user B, a first touch authentication count "2" for the first command (an example of a first command-use set count of the present disclosure) and a second touch authentication count "3" for the second command (an example of a second command-use set count of the present disclosure) are associated. In this case, the command process operator 114 of the server device 1 issues the first command if the touch count matches the first touch authentication count, and thus the authentication of the user B is granted by the authentication process operator 213, and issues the second command if the touch count matches the second touch authentication count, and thus the authentication of the user B is granted by the authentication process operator 213. It is noted that the command process operator 114 issues the command at least either one of at the time of login (at the start of the meeting) when the user inputs the identification information (performs the authentication input operation), during a normal time (during the meeting) after the login, or at the time of logout.

It is noted that in another embodiment of the authentication device 2, some or all of the process operators included in the controller 21 of the authentication device 2 may be provided in the server device 1.

Further, the authentication device 2 may be configured not to consider the operation count of the user input operation. Specifically, the authentication device 2 may authenticate the user, based on personal information acquired by the identification information acquirer 211 when the user inputs once the personal information such as a card ID, a password, and biometric information through the operation display 23. That is, the above-described configuration where the user is authenticated based on the operation count is an example of an authentication process of the present disclosure, and is not limiting. Therefore, the authentication process of the present disclosure is not limited to a type and the count of the user input operation, and may apply a conventionally well-known method.

Terminal Device 3

As illustrated in FIG. 1, the terminal device 3 includes a controller 31, a storage 32, an operation display 33, a communication I/F 34, and the like. The terminal device 3 may be a mobile terminal owned by a user and carried to the meeting, or may be a terminal device provided in advance in the meeting room.

The communication IF 34 is a communication interface for connecting the terminal device 3 to the communication network N1 in a wired or wireless manner to execute data communication according to a predetermined communication protocol between the terminal device 3 and an external device such as the server device 1 via the communication network N1.

The operation display 33 is a user interface including a display such as a liquid crystal display or an organic EL display that displays various types of information, and an operation processor such as a mouse, a keyboard, or a touch panel that receives an operation. For example, a user participating in the meeting registers the authentication information in the operation display 33 before a start of the meeting. In addition, the meeting administrator registers the meeting information in the operation display 33 before a start of the meeting.

The storage 32 is a non-volatile storage including a semiconductor memory, an HDD, an SSD, or the like that stores various types of information. For example, the storage 32 stores a control program such as a command execution program for causing the controller 31 to execute a command execution process (see FIG. 7) described later. For example, the command execution program is recorded non-temporarily on a computer-readable recording medium such as a USB, a CD, or a DVD, and read by a reading device (not illustrated) such as a USB drive, a CD drive, or a DVD drive electrically connected to the terminal device 3, and stored in the storage 32. Further, the command execution program may be downloaded from an external device via the communication network N1 and stored in the storage 32.

The controller 31 includes control devices such as a CPU, a ROM, and a RAM. The CPU is a processor that executes various types of arithmetic processes. The ROM is a non-volatile storage in which a control program such as BIOS and OS for causing the CPU to execute various types of processes is stored in advance. The RAM is a volatile or non-volatile storage that stores various types of information, and is used as a temporary storage memory (working area) for various types of processes executed by the CPU. Then, the controller 31 controls the terminal device 3 by causing the CPU to execute various types of control programs stored in advance in the ROM or the storage 32.

Specifically, the controller 31 includes various types of process operators such as a command acquirer 311 and a command executor 312. It is noted that the controller 31 functions as the various types of process operators by causing the CPU to execute various types of processes according to the command execution program. Moreover, some or all of the process operators included in the controller 31 may include an electronic circuit. It is noted that the command execution program may be a program for causing a plurality of processors to function as the various types of process operators.

The command acquirer 311 acquires the command transmitted from the server device 1. For example, if the authentication is granted for the authentication input operation of the user A at the start of the meeting, the command acquirer 311 acquires a command ("display material-1") corresponding to the user A transmitted from the server device 1. Further, for example, if the authentication is granted for the authentication input operation of the user B during the meeting, the command acquirer 311 acquires a command ("display material-2") corresponding to the user B transmitted from the server device 1.

The command executor 312 executes the command acquired by the command acquirer 311. For example, if the command acquirer 311 acquires a command corresponding to the user A ("display material-1"), the command executor 312 displays the "material-1" on the display device 4. Also, for example, if the command acquirer 311 acquires a command corresponding to the user B ("display material-2"), the command executor 312 displays the "material-2" on the display device 4.

It is noted that here, since the command corresponding to the user B is a command executed when the authentication is granted in the authentication (normal authentication) during the meeting, the command executor 312 switches the "material-1" displayed on the display device 4 to the "material-2". Further, if the "material-1" is saved in the terminal device 3A, and the "material-2" is saved in the terminal device 3B, the terminal device 3B acquiring the command corresponding to the user B switches the connection to the display device 4 from the terminal device 3A to the terminal device 3B to display the "material-2". That is, the command may include a switching control command for switching the connection (input terminal) with the display device 4.

It is noted that in another embodiment of the terminal device 3, the command executor 312 may be provided in the server device 1. In this case, the server device 1 executes the command to perform a display control of the display device 4.

Authentication Process

Next, an authentication process to be executed by the controller 21 of the authentication device 2 will be described with reference to FIG. 5A and FIG. 5B. For example, the controller 21 starts executing the authentication process by starting an execution of the authentication program, in response to a user authentication input operation (touch operation). It is noted that the authentication process may end uncompleted according to a predetermined operation in the authentication device 2. It is noted that the controller 21 executes the authentication process every time the authentication input operation is performed by the user at the start of the meeting or during the meeting.

It is noted that one or more steps included in the authentication process described here may be omitted where appropriate. In addition, each of the steps in the authentication process may be executed in a different order as long as a similar operation and effect is obtained. Further, although a case where each of the steps in the authentication process is executed by the controller 21 will be described as an example here, in another embodiment, each of the steps in the authentication process may be dispersedly executed by a plurality of processors.

Figure 5A:
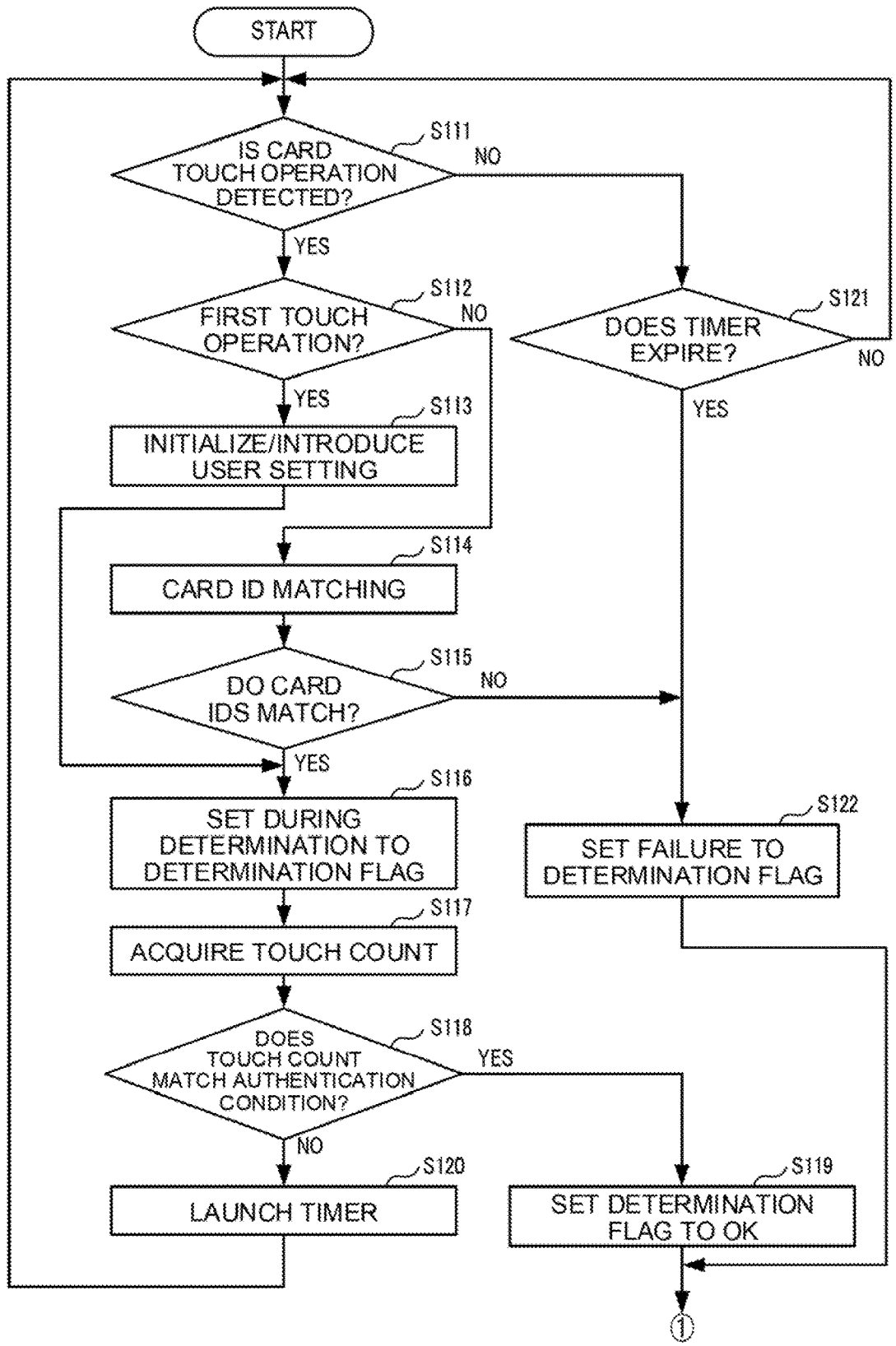
FIG. 5A is a flowchart illustrating an example of a procedure of an authentication process to be executed in the meeting system according to the embodiment of the present disclosure.
Figure 5B:
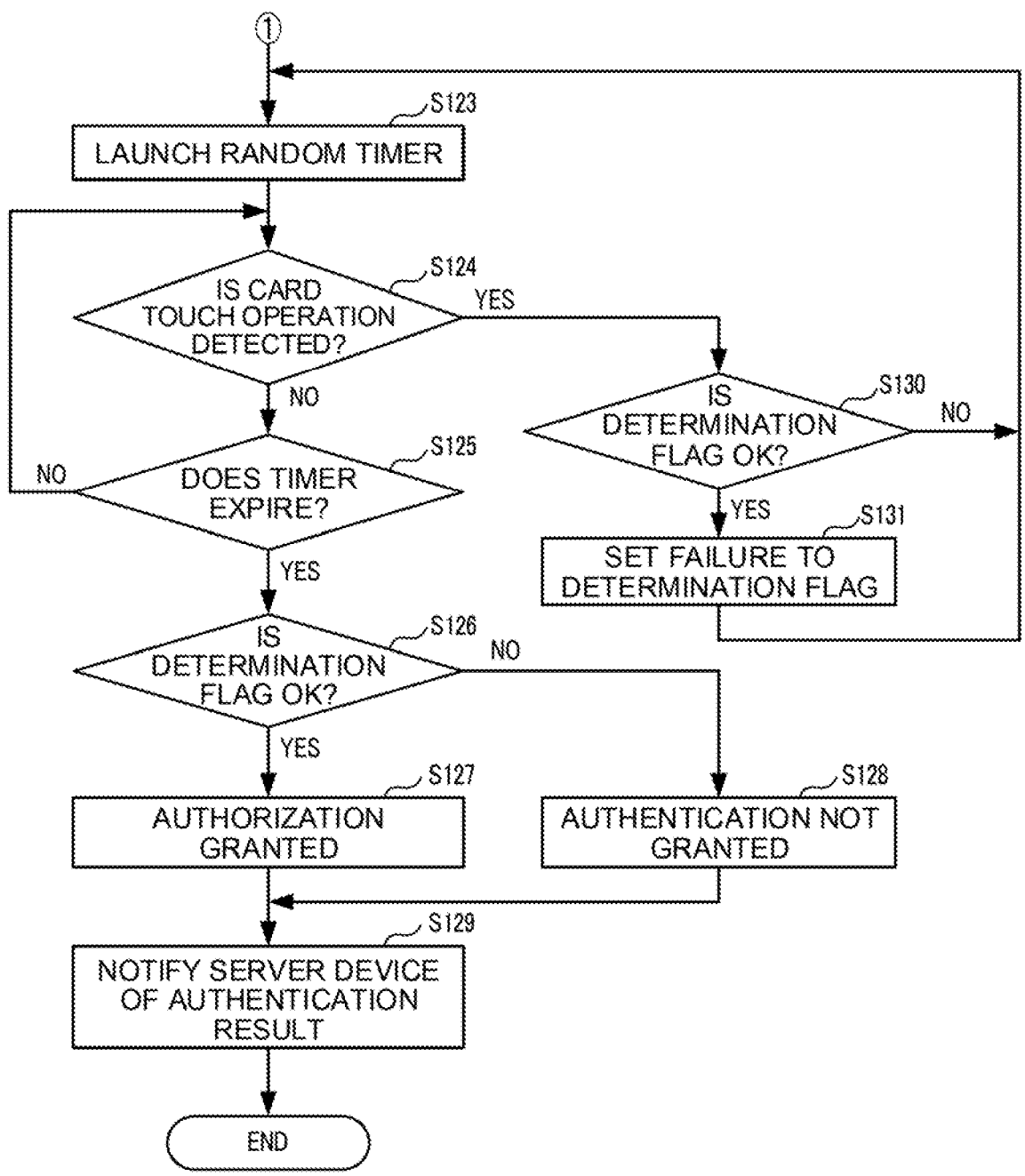
FIG. 5B is a flowchart illustrating an example of the procedure of the authentication process to be executed in the meeting system according to the embodiment of the present disclosure.

It is noted that the authentication processes illustrated in FIG. 5A and FIG. 5B are indicative of processes when the user A is authenticated based only on the authentication input operation of the user A participating in the meeting, for example. A process (see FIG. 12) requiring the authentication input operation of the user A and an authentication input operation of another user when the user A is authenticated will be described later.

First, the controller 21 determines whether or not a touch operation (or a swipe operation) with the card ID by the user is detected (S111). If detecting the touch operation (S111: YES), the controller 21 determines whether or not the touch operation is an initial (first) touch operation (S112). It is noted that after the first touch operation is detected in step S111, a timer will be launched in a subsequent process (S120); however, if the touch operation is not performed, the process normally moves to step S111 by the controller 21 determining whether the timer expires (S121: NO). On the other hand, if a predetermined time period passes without the touch operation not being detected (S111: NO) (if the timer expires) (S121: YES), it is determined that a predetermined operation cannot be satisfied during the user authentication input operation, and thus, the process proceeds to step S122 described later.

If the touch operation is the initial touch operation (S112: YES), the controller 21 acquires (introduces) the meeting authentication information DB 122 (see FIG. 4) of the user (S113) after initialization, and the process proceeds to S116.

On the other hand, if the touch operation is not the initial touch operation (S112: NO), the controller 21 performs matching of the card ID (S114) to determine whether or not the card IDs match (S115). Specifically, the controller 21 determines whether or not the card ID acquired in the previous touch operation matches the card ID acquired in the current touch operation. If the card IDs match (S115: YES), the process proceeds to step S116, and if the card IDs do not match (S115: NO), the process proceeds to step S122 described later.

Next, the controller 21 sets "during determination" to a determination flag (S116), and acquires (counts) the touch count with the ID card. Next, the controller 21 determines whether or not the touch count matches the authentication condition (touch authentication count) associated with the card ID. If the touch count matches the touch authentication count (S118: YES), the controller 21 sets the determination flag to "OK" (S119). Then, the process proceeds to step S123. On the other hand, if the touch count does not match the touch authentication count (S118: NO), the process returns to S111 to repeat the above-described processes.

Here, if the touch operation is not performed within a predetermined time period (S121: YES), or if the card IDs do not match (S115: NO), the controller 21 sets "failure" to the determination flag (S122). Then, the process proceeds to step S123.

In step S123, the controller 21 launches a timer set to a random time. It is noted that here, it may be configured so that a relatively long time period is set to the timer as compared to the timer time period set in step S120. This is to prevent a case where an element for determining the authentication condition is applied in a short time period and in an unthoughtful manner if the timer time period is set to a shorter time period. Next, the controller 21 determines whether or not the touch operation with the card ID by the user is detected (S124). If the touch operation with the card ID is not performed within a randomly set predetermined time period (S125: NO), the controller 21 determines whether "OK" is set to the determination flag (S126). If "OK" is set to the determination flag (S126: YES), the controller 21 grants the authentication of the user (S127), and if "OK" is not set to the determination flag (S126: NO), the controller 21 does not grant the user authentication (S128). Thereafter, the controller 21 notifies the user and the server device 1 of the result of the authentication process ("authentication granted" or "authentication not granted") (S129).

On the other hand, if the touch operation with the card ID is performed within a randomly set predetermined time period (S124: YES), the controller 21 determines whether "OK" is set to the determination flag (S130). If "OK" is set to the determination flag (S130: YES), the controller 21 sets "failure" to the determination flag (S131). Then, the process proceeds to step S123. If "OK" is not set to the determination flag (S130: NO), the process proceeds to step S123. Thus, the authentication process is executed.

Command Issuance Process

Figure 6:
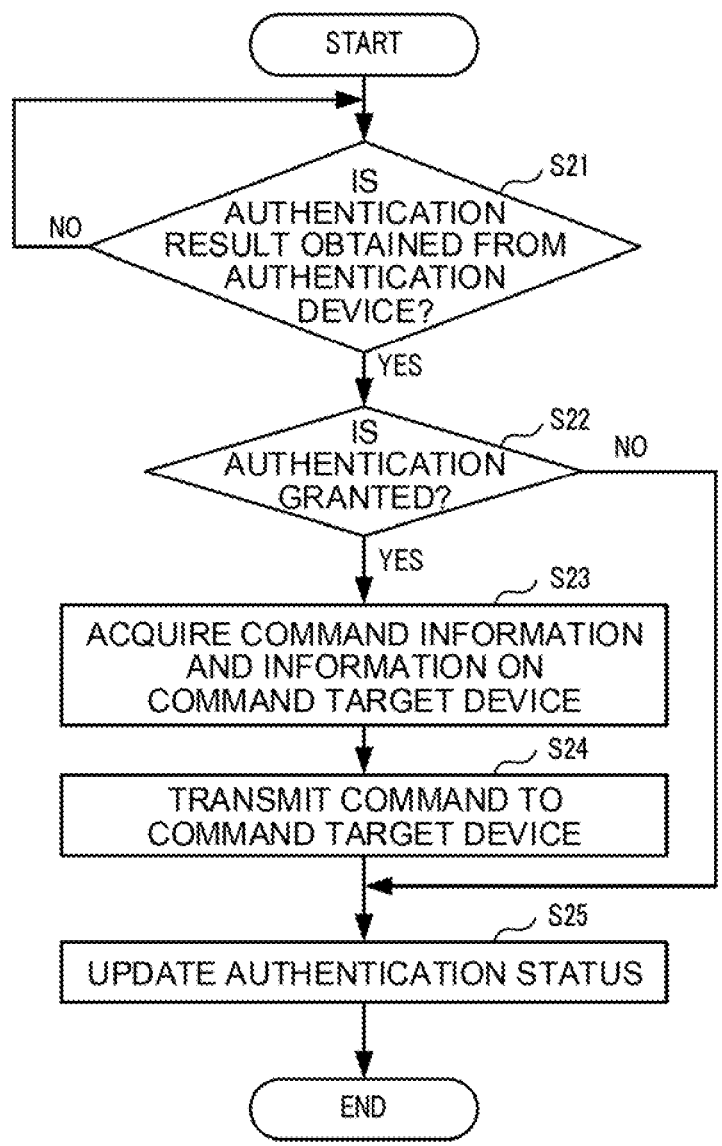
FIG. 6 is a flowchart illustrating an example of a procedure of a command issuance process to be executed in the meeting system according to the embodiment of the present disclosure.

Next, the command issuance process to be executed by the controller 11 of the server device 1 will be described with reference to FIG. 6. For example, when acquiring the authentication result from the authentication device 2, the controller 11 starts executing the command issuance process by starting an execution of the command issuance processing program.

It is noted that the present disclosure can be regarded as an invention of an information processing method for executing one or more steps included in the command issuance process, and one or more steps included in the command issuance process described here may be omitted where appropriate. Further, each of the steps in the command issuance process may be executed in a different order as long as a similar operation and effect is obtained. Further, although a case where each of the steps in the command issuance process is executed by the controller 11 will be described as an example here, in another embodiment, each of the steps in the command issuance process may be dispersedly executed by a plurality of processors.

In step S21, if the controller 11 (authentication result acquirer 113) acquires the authentication result from the authentication device 2, the process proceeds to step S22.

In step S22, the controller 11 (command process operator 114) determines whether or not the authentication result is "authentication granted". If the authentication result is "authentication granted" (S22: YES), the process proceeds to step S23, and if the authentication result is "authentication not granted" (S22: NO), the process proceeds to step S25.

In step S23, the controller 11 (command process operator 114) acquires information on the command and the command target device which are associated with the card ID, from the meeting authentication information DB 122 (see FIG. 4) stored in the storage 12.

In step S24, the controller 11 (command process operator 114) issues (transmits) the acquired command to the terminal device 3 being the command target device.

In step S25, the controller 11 (command process operator 114) updates the authentication status of the meeting authentication information DB 1.22 (see FIG. 4). Thus, the command issuance process is executed.

Command Execution Process

Figure 7:
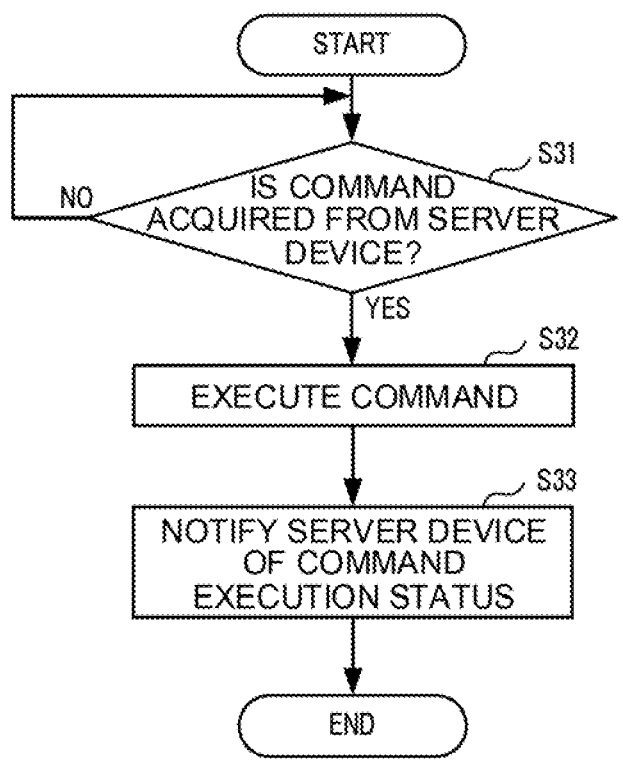
FIG. 7 is a flowchart illustrating an example of a procedure of a command execution process to be executed in the meeting system according to the embodiment of the present disclosure.

Next, the command execution process to be executed by the controller 31 of the terminal device 3 will be described with reference to FIG. 7. For example, when acquiring the command from the server device 1, the controller 31 starts executing the command execution process by starting an execution of the command issuance process program.

It is noted that the present disclosure can be regarded as an invention of an information processing method for executing one or more steps included in the command execution process, and one or more steps included in the command execution process described here may be omitted where appropriate. Further, each of the steps in the command execution process may be executed in a different order as long as a similar operation and effect is obtained. Further, although a case where each of the steps in the command execution process is executed by the controller 31 will be described as an example here, in another embodiment, each of the steps in the command execution process may be dispersedly executed by a plurality of processors.

In step S31, if the controller 31 (command acquirer 311) acquires the command from the server device 1, the process proceeds to step S32.

In step S32, the controller 31 (command executor 312) executes the command.

In step S33, the controller 31 (command executor 312) notifies the server device 1 of the execution status of the command. The server device 1 registers information (not illustrated) and the like indicating that the command is executed, into the meeting authentication information DB 122.

Figure 8:
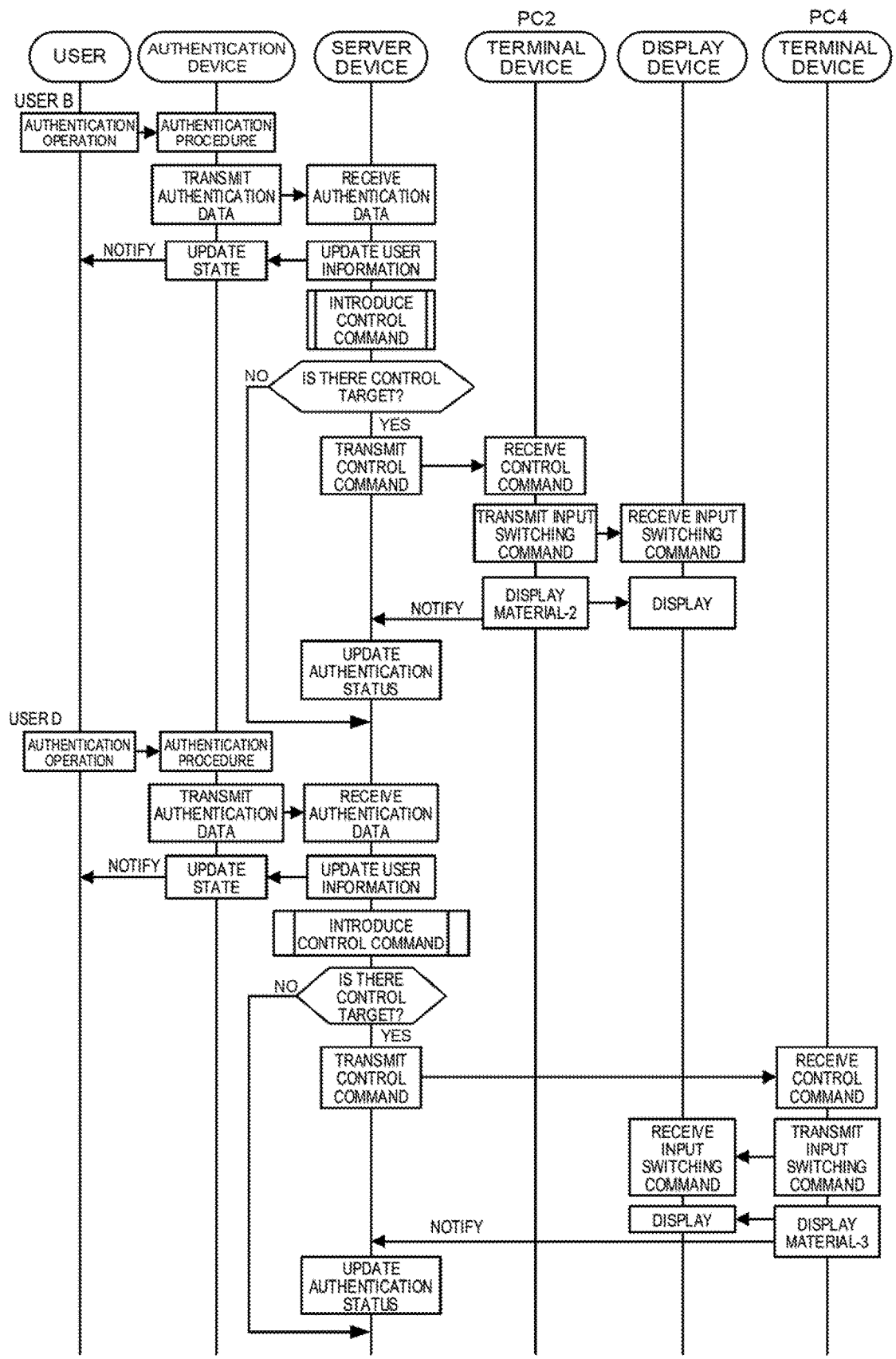
FIG. 8 is a sequence chart illustrating an overall process flow of the meeting system according to the embodiment of the present disclosure.

Here, FIG. 8 illustrates a flow of processes of an entire system when a control command for controlling the display screen of the display device 4 is automatically executed according to the authentication process. As illustrated in a sequence chart of FIG. 8, if the authentication process is performed according to the authentication operation (authentication input operation) of the user B, the control command "display material-2" with the command ID "2" (see FIG. 3) is transmitted to a PC 2 (terminal device 3), and the "material-2" is displayed on the display device 4. Subsequently, if the authentication process is performed according to the authentication operation (authentication input operation) of the user D, the control command "display material-3" with the command ID "1" (see FIG. 3) is transmitted to the PC 4 (terminal device 3), and inputs of the display device 4 are switched, and the display screen is switched to "material-3". Thus, the sequence of the entire system is realized by combining each of the above-described processes (the authentication process, the command issuance process, and the command execution process).

FIG. 9 schematically illustrates the input switching timing illustrated in FIG. 8. As illustrated in FIG. 9, if the authentication processes for the users B and D are executed in this order, input terminals 1 and 2 of the display device 4 become active in this order, and the display screen is switched. That is, at the timing when the user D is authenticated, the display screen of the "material-2" is switched to the "material-3" of the display screen corresponding to the control command corresponding to the user D.

In the meeting system 100 according to the embodiment of the present disclosure, if a user participating in a meeting performs an authentication input operation at a start of the meeting or during the meeting and the authentication of the user is granted, a predetermined command associated with the card ID (identification information) acquired by the authentication input operation is issued. Therefore, the user needs not perform a separate operation for executing the command, for example, an operation for displaying a material used in the meeting on the display device 4 and an operation for launching a predetermined application in the terminal device 3. Thus, the meeting system 100 can simplify user operations in the meeting.

A user participating in the meeting performs an authentication input operation according to an authentication condition (for example, the touch count) that only the user can know. Thus, even if a third party not eligible for participation in the meeting illegally obtains the participant's ID card 5, it is possible to prevent the third party from participating in the meeting. Further, the authentication input operation is a simple operation of touching the reader 25 with the ID card 5 a predetermined number of times set for each user, and is not an operation of inputting a user ID or the like. Thus, the convenience of the user authentication may not be sacrificed. Therefore, according to the meeting system 100, it is also possible to improve a security level without sacrificing the convenience of the user authentication.

The present disclosure is not limited to the above-described embodiment. A modification corresponding to another embodiment of the present disclosure will be described below.

First Modification

In the meeting system 100 according to another embodiment, when the user A participating in the meeting is authenticated, for example, based on the authentication input operation of the user A and the authentication input operation of another user participating in the meeting other than the user A, for example, the user C, the authentication process for the login of the user A is performed. Specifically, for example, the controller 11 (meeting authentication information manager 112) of the server device 1 sets the touch count of the user A to "five times" as an authentication condition corresponding to the login of the user A, and sets the touch count of the user C to "three times". Further, the controller 11 (meeting authentication information manager 112) sets an order of the authentication input operation. For example, the controller 11 sets the authentication input operation of the user A to "first", and sets the authentication input operation of the user C to "second". The controller 11 registers the set authentication conditions (the touch authentication count) in the meeting authentication information DB 122 (see FIG. 10), and notifies the user A and the user C of the set authentication conditions. For example, the controller 11 (meeting authentication information manager 112) notifies the user A of information illustrated in FIG. 11A, as information on the authentication condition corresponding to the user A, and notifies the user C of information illustrated in FIG. 11B, as information on the authentication condition corresponding to the user C. If the user A initially (firstly) performs five touch operations, and subsequently the user C (secondly) performs three touch operations, the controller 21 of the authentication device 2 grants the authentication of the user A and transmits the command ("display material-1"). It is noted that FIG. 11A and FIG. 11B illustrate a configuration where information on the authentication condition other than the operation to be performed by the user him/herself is not disclosed, but this is not limiting, so a configuration where the authentication condition of another user associated with the authentication of the user him/herself is disclosed may be acceptable.

Similarly, as the authentication condition corresponding to the user C, the controller 11 sets the touch count of the user C to "two times" and sets the touch count of the user B to "single time". Further, the controller 11 sets the authentication input operation of the user C to "first", and sets the authentication input operation of the user B to "second". The controller 11 registers the set authentication conditions (the touch authentication count) in the meeting authentication information DB 122 (see FIG. 10) and notifies the user C and the user B of the set authentication conditions. For example, the controller 11 notifies the user C of information illustrated in FIG. 11B, as the information on the authentication condition corresponding to the user C, and notifies the user B of information illustrated in FIG. 11C, as the information on the authentication condition corresponding to the user B. The controller 21 of the authentication device 2 grants the authentication of the user C if the user C initially (firstly) performs two touch operations and the user B subsequently (secondly) performs one touch operation.

Figure 12:
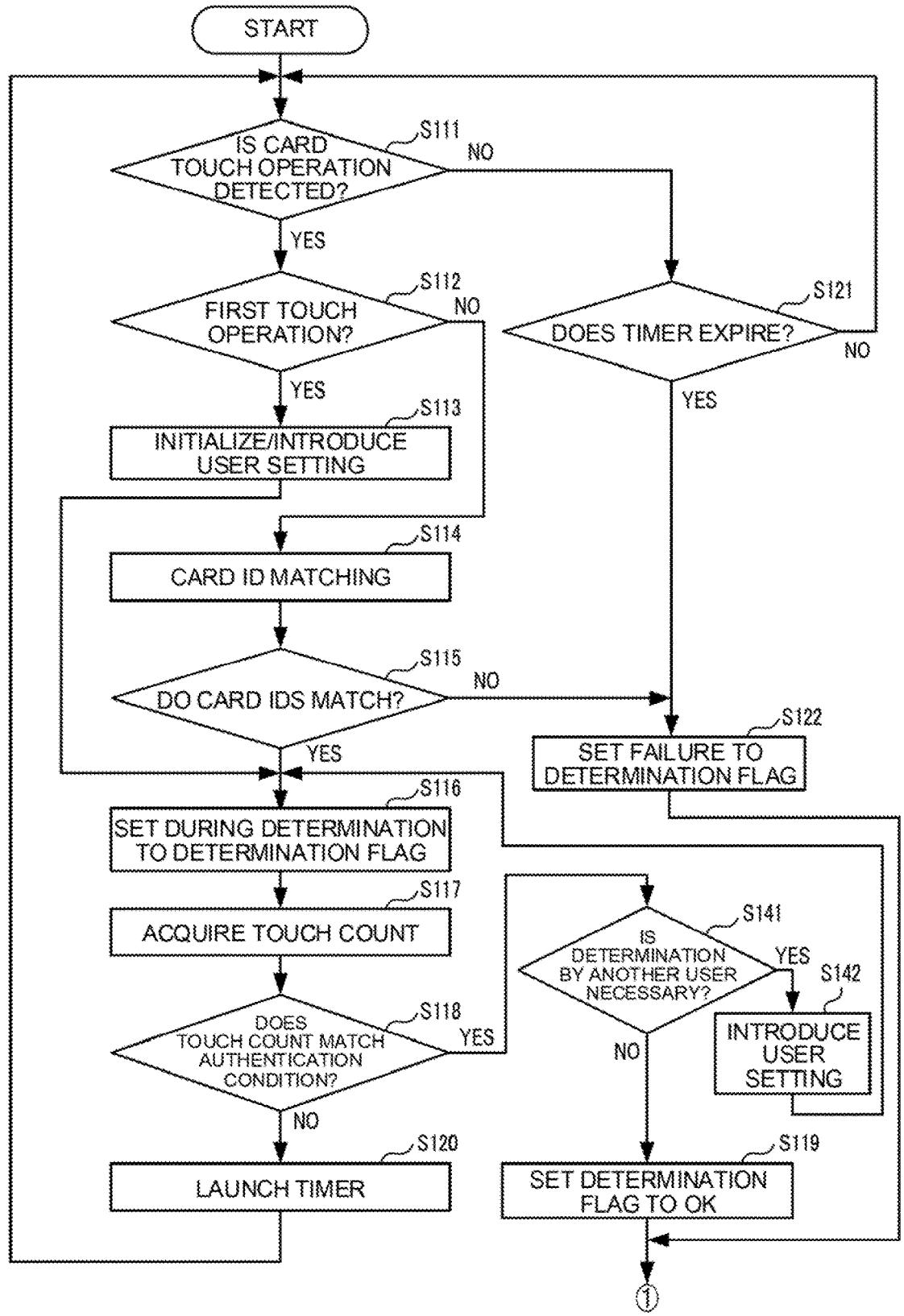
FIG. 12 is a flowchart illustrating another example of the procedure of the authentication process to be executed in the meeting system according to the embodiment (first modification) of the present disclosure.

FIG. 12 is a flowchart illustrating a part of the authentication process to be executed by the controller 21 of the authentication device 2 according to the first modification. The authentication process according to the first modification is different from the authentication process illustrated in FIG. 5A and FIG. 5B in that steps S141 and S142 are added, and the remaining steps are the same. Here, for convenience, steps different from the authentication process illustrated in FIG. 5A and FIG. 5B will be described, and the same steps will not be described.

In step S141, the controller 21 determines whether or not an authentication input operation of another user is necessary for the authentication of a user to be authenticated. If an authentication input operation of another user is necessary (S141: YES), the controller 21 acquires (introduces) the authentication information (authentication condition) of the other user from the meeting authentication information DB 122 (see FIG. 4) (S142), and then, the process proceeds to step S116. In step S116 and subsequent steps, a touch count determination process (S118) corresponding to the authentication input operation (touch operation) of the other user is performed, for example. If the touch count of the other user matches the authentication condition (S118: YES), and there are no other users further requiring an authentication input operation (S141: NO), the process proceeds to step S119.

The subsequent steps are the same as those in the authentication process illustrated in FIG. 5B.

In addition, a configuration may be that as the authentication condition corresponding to each of the user A and the user C, if the controller 11 of the server device 1 sets the touch count of the user A to "five times", sets the touch count of the user C to "three times", and if each of the user A and the user C performs the authentication input operation according to the authentication condition, the controller 21 of the authentication device 2 simultaneously grants the authentications of the user A and the user C. An example of the meeting authentication information DB 122 in this configuration is shown in FIG. 13. It should be noted that a symbol "*" in a user designation of the authentication condition in FIG. 13 can be interpreted as any order would be possible.

Thus, the controller 21 of the authentication device 2 consecutively acquires first identification information (first card ID) corresponding to a first user and a first operation count (first touch count), and second identification information (second card ID) corresponding to a second user and a second operation count (second touch count). In addition, the controller 21 determines whether or not the acquired first operation count matches a first set count (first touch authentication count) previously associated with the first identification information, and determines whether or not the acquired second operation count matches a second set count (second touch authentication count) previously associated with the second identification information. Then, if determining that the first operation count matches the first set count and the second operation count matches the second set count, the controller 21 grants the authentication of at least one of the first user and the second user.

It is noted that when performing the authentication of the first user, the authentication device 2 may add a determination process of an authentication input operation of another single user (for example, the second user), and may add a determination process of an authentication input operation of each of a plurality of other users. Further, an order of the authentication input operations of the first user and the other users to be authenticated may be regulated and a process of determining the order may be added to the determination process. For example, when the authentication input operation by the first user and the authentication input operation by the second user are consecutively performed in this order, if the controller 21 determines that the first operation count matches the first set count, and the second operation count matches the second set count, the controller 21 grants the authentication of the first user.

According to these configurations, during the authentication of the user planning to participate in the meeting, the authentication input operation of a third-party user other than the user him/herself is needed in addition to the authentication input operation of the user him/herself, and thus, the security level can be further improved. It is noted that the controller 21 of the authentication device 2 can arbitrarily combine a plurality of authentications by the authentication operations of users who are meeting participants. According to these configurations, it is possible to further improve the security level in accordance with the combination of authentication input operations by a third-party user.

Moreover, in the configuration, the authentication device 2 may change a display manner of the display (LED) based on the authentication input operations by a plurality of users. For example, in the above-described example in which the user A is authenticated, if the user A touches the reader 25 with the ID card 5A five times, the LED is lit in green from red during standby, and subsequently, if the user C touches the reader 25 with the ID card 5C three times, the authentication of the user A is granted and the LED is lit in yellow.

Second Modification

In the meeting system 100 according to another embodiment, for example, if the meeting ends or if the user leaves during the meeting, an authentication process for logging off from the meeting system may be performed. In the authentication process, the authentication is performed based on the authentication input operation of the user. It is noted that the authentication condition at the time of participating in the meeting (at the time of login) and the authentication condition at the time of logoff may be set to be the same condition or different conditions.

Third Modification

In the meeting system 100 according to another embodiment, the controller 21 (authentication process operator 213) of the authentication device 2 may control the operation display 23 to display the touch count obtained by counting the authentication input operation (touch operation) of the user, on the display of the operation display 23. As a result, the user can grasp progress of the touch operation, and thus, the user can accurately perform the touch operation according to the set touch count.

In the above configuration, the information on the touch count may be leaked to a third party. In such a case, the controller 21 (operation count acquirer 212) of the authentication device 2 corrects the touch count to be displayed on the display, and controls the identification information acquirer 211 to continue the acquisition operation of the ID information. It is noted that the controller 21 (operation count acquirer 212) may control the display to display a dummy count representing the corrected touch count. Accordingly, since the dummy count can be displayed if the authentication is granted, if the authentication is not granted, or during the touch operation, information leakage of the legitimate touch count can be prevented.

Fourth Modification

In the meeting system 100 according to another embodiment, the display device 4 may include the function of the terminal device 3, and the terminal device 3 may be omitted. In this configuration, the server device 1 issues (transmits) the predetermined command to the display device 4, and the display device 4 executes the command. Further, in the meeting system 100 according to another embodiment, the display device 4 may be omitted. In this configuration, each user participating in the meeting uses his/her own terminal device 3. A display screen of each terminal device 3 may be shared. Further, the meeting system 100 according to another embodiment may include only the server device 1. In this configuration, the server device 1 performs the authentication process, the command issuance process, and the command execution process. Further, the meeting system 100 according to another embodiment may include the server device 1 and the authentication device 2.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An information processing system comprising:
   identification information circuitry that acquire, based on an input operation by a user of identification information for identifying the user, the identification information;
   authentication circuitry that determine whether or not to grant an authentication of the user, based on the identification information acquired by the identification information circuitry; and
   command issuer circuitry that issue a command corresponding to a desired operation of the user, the desired operation being associated with the identification information corresponding to the user, if the authentication of the user is granted by the authentication circuitry,
   the information processing system further comprising:
      an operation count circuitry that acquire an operation count indicating a count of the input operations performed by the user within a predetermined time period, wherein
      the authentication circuitry grant the authentication of the user if the operation count acquired by the operation count circuitry matches a set count previously associated with the identification information acquired by the identification information circuitry, and does not grant the authentication of the user if the operation count does not match the set count,
      wherein the identification information circuitry acquire a first identification information corresponding to a first user and a second identification information corresponding to a second user,
      the operation count circuitry acquire a first operation count by the first user and a second operation count by the second user, and
      the authentication circuitry grant an authentication of at least one of the first user and the second user if the first operation count acquired by the operation count circuitry matches a first set count previously associated with the first identification information acquired by the identification information circuitry, and the second operation count acquired by the operation count circuitry matches a second set count previously associated with the second identification information acquired by the identification information circuitry.

2. The information processing system according to claim 1, further comprising: a terminal information for identifying a terminal device that executes the command is associated in advance with the identification information corresponding to the user, and
   the command issuer circuitry transmit the command associated with the identification information corresponding to the user to the terminal device corresponding to the terminal information associated with the identification information corresponding to the user, if the authentication of the user is granted by the authentication circuitry.

3. The information processing system according to claim 1, wherein the identification information corresponding to the user is associated with a first command information of a first command and a second command information of a second command, and a first command input operation indicating the input operation for the first command and a second command input operation indicating the input operation for the second command, and
   the command issuer circuitry issue the first command if the authentication of the user is granted based on the first command input operation, and issues the second command if the authentication of the user is granted based on the second command input operation.

4. The information processing system according to claim 1, wherein the input operation is an operation of causing a reader that reads information on a card medium to read the card medium including the identification information, and
   wherein the operation count is the number of time the card medium is read by the reader.

5. The information processing system according to claim 1, wherein the operation count circuitry count the operation count within the predetermined time period, and if the identification information is consecutively acquired by the identification information circuitry within the predetermined time period, determines that the operation count indicates the count of the input operations performed by the user and acquires the counted operation count.

6. The information processing system according to claim 5, wherein if the operation count does not match the set count, the operation count circuitry reset the counted operation count.

7. The information processing system according to claim 1, further comprising: a light emitter that lights in a predetermined color; and
   notification circuitry that notify the user of a result of an authentication process by the authentication circuitry, wherein
   the notification circuitry cause the light emitter to light up in a first display color if the authentication of the user is granted by the authentication circuitry, and cause the light emitter to light up in a second display color if the authentication of the user is not granted by the authentication circuitry.

8. The information processing system according to claim 1, wherein the authentication circuitry determine whether or not to grant the authentication of the user, based on the identification information acquired by the identification information circuitry by the input operation of the user at a start of a meeting or during a meeting, and
   the command issuer circuitry issue, if the authentication of the user is granted, the command for displaying a material associated with the identification information and used in the meeting on a predetermined terminal device, or the command for launching an application associated with the identification information and used in the meeting in a predetermined terminal device.

9. An information processing system comprising:
   identification information circuitry that acquire, based on an input operation by a user of identification information for identifying the user, the identification information;
   authentication circuitry that determine whether or not to grant an authentication of the user, based on the identification information acquired by the identification information circuitry; and
   command issuer circuitry that issue a command corresponding to a desired operation of the user, the desired operation being associated with the identification information corresponding to the user, if the authentication of the user is granted by the authentication circuitry,
   the information processing system further comprising: an operation count circuitry that acquire an operation count indicating a count of the input operations performed by the user within a predetermined time period, wherein the authentication circuitry grant the authentication of the user if the operation count acquired by the operation count circuitry matches a set count previously associated with the identification information acquired by the identification information circuitry, and does not grant the authentication of the user if the operation count does not match the set count wherein the identification information circuitry acquire a first identification information corresponding to a first user and a plurality of pieces of identification information respectively corresponding to a plurality of other users, the operation count circuitry acquire a first operation count by the first user and a plurality of operation counts by the plurality of other users, and the authentication circuitry grant the authentication of the first user if the first operation count acquired by the operation count circuitry match a first set count previously associated with the first identification information acquired by the identification information circuitry, and the plurality of operation counts acquired by the operation count circuitry respectively match a plurality of set counts previously associated respectively with the plurality of pieces of identification information acquired by the identification information circuitry.

10. An information processing method comprising causing one or more processors:

to acquire, based on an input operation by a user of identification information for identifying the user, the identification information;

to determine whether or not to grant an authentication of the user based on the acquired identification information;

to issue a command corresponding to a desired operation of the user, the desired operation being associated with the identification information corresponding to the user, if the authentication of the user is granted; and the method further causes one or more processors:

to acquire an operation count indicating a count of the input operations performed by the user within a predetermined time period, wherein to grant the authentication of the user if the operation count matches a set count previously associated with the identification information, and does not grant the authentication of the user if the operation count does not match the set count, to acquire a first identification information corresponding to a first user and a second identification information corresponding to a second user, to acquire a first operation count by the first user and a second operation count by the second user, and to grant an authentication of at least one of the first user and the second user if the first operation count matches a first set count previously associated with the first identification information, and the second operation count matches a second set count previously associated with the second identification information.

* * * * *